United States Patent
Shao et al.

(10) Patent No.: US 10,832,147 B1
(45) Date of Patent: Nov. 10, 2020

(54) SYSTEMS AND METHODS FOR DETERMINING RELATIVE IMPORTANCE OF ONE OR MORE VARIABLES IN A NON-PARAMETRIC MACHINE LEARNING MODEL

(71) Applicant: Capital One Services, LLC, McLean, VA (US)

(72) Inventors: Ruoyo Shao, Allen, TX (US); Kurt Adrian Wolf, Frisco, TX (US); Sang Jin Park, Allen, TX (US); Jacky Huang Zheng Kwok, Allen, TX (US); Cheng Jiang, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/716,604

(22) Filed: Dec. 17, 2019

(51) Int. Cl.
*G06N 5/04* (2006.01)
*G06N 20/10* (2019.01)

(52) U.S. Cl.
CPC .............. *G06N 5/04* (2013.01); *G06N 20/10* (2019.01)

(58) Field of Classification Search
CPC ...................................................... G06N 5/04
See application file for complete search history.

(56) References Cited

U.S. PATENT DOCUMENTS 9,697,469 B2 * 7/2017 McMahon ............. G06N 5/047

FOREIGN PATENT DOCUMENTS

WO WO-2004053659 A2 * 6/2004 ............. G06N 20/00

OTHER PUBLICATIONS

Bolton, Christine "Logistic regression and its application in credit scoring" University of Pretoria [Published 2009] [Retrieved Apr. 2020] <URL: http://citeseerx.ist.psu.edu/viewdoc/download?doi=10.1.1.1024.2660&rep=rep1&type=pdf> (Year: 2009).*
FICO "Building Powerful, Predictive Scorecards" FICO White Paper [Published Mar. 2014] [Retrieved Apr. 2020] <URL: https://www.fico.com/en/resource-download-file/3477> (Year: 2014).*

(Continued)

*Primary Examiner* — Ann J Lo
*Assistant Examiner* — Fen Christopher Tamulonis
(74) *Attorney, Agent, or Firm* — Hunton Andrews Kurth LLP

(57) ABSTRACT

Systems and methods for determining relative importance of one or more variables in a non-parametric model include: receiving, raw values of the variables corresponding to one or more entities; processing the raw values using a statistical model to obtain probability values for the variables and an overall prediction value for each entity; determining a plurality of cumulative distributions for the variables based on the raw values and the number of entities having a specific raw value; grouping the variables into a plurality of equally sized buckets based on the cumulative distributions; determining a mean probability value for each bucket; assigning a rank number for each bucket based on the mean probability values; compiling a table for the entities based on the raw values and the buckets corresponding to the raw values; and determining the relative importance of the variables for the entities based on the rank numbers.

10 Claims, 11 Drawing Sheets

| Variable | Variable Definition | Turn Down Reason |
|---|---|---|
| SML | Sum of monthly payments for all open Mortgage trade lines | Amount of payment(s) on installment account(s) |
| NAFI | Number of Auto Finance Inquiries | Number of recent inquires |
| NOR | Number of months since opened date on most recent Revolving trade line | Age of newest revolving account |
| SAF | Sum of balances for all open Auto Finance trade lines | Installment account balance(s) are too low |
| NAFT | Number of Auto Finance trade lines ever. | Number of installment accounts |
| NET | Number of Education trade lines ever. | Number of installment accounts |
| NFCT | Number of Finance Company trade lines ever. | Number of personal finance loan(s). |
| NIT | Number of Installment trade lines ever. | Number of installment accounts |
| NRT | Number of Revolving trade lines ever. | Number of new revolving accounts |

(columns labeled 1110, 1120, 1130)

(56) References Cited

OTHER PUBLICATIONS

Brusilovskiy, Pavel et al."Credit Risk Evaluations of Online Personal Loan Applicants . . . " Business Intelligence Solutions white paper [Published 2008] [Retrieved Apr. 2020] <URL: http://www.bisolutions.us/web/graphic/Credit-Risk-Evaluation-of-Online-Personal-Loan.pdf> (Year: 2008).*

Li, Jun et al. "Parametric and non-parametric combination model to enhance overall performance on default prediction" JSSC vol. 27 pp. 950-969 [Published 2014] [Retrieved Apr. 2020] <URL: https://link.springer.com/article/10.1007/s11424-014-3273-8> (Year: 2014).*

Shen, Xipeng et al. "Adaptive Data Partition for Sorting using Probability Distribution" ICPP'04 [Published 2004][Retrieved Apr. 2020] <URL: https://ieeexplore.ieee.org/abstract/document/1327928> (Year: 2004).*

Zhao, Zhongxiao et al. "An Innovative Bucket Sorting Algorithm Based on Probability Distribution." WCCSIE '09 [Published 2009] [Retrieved Apr. 2020] <URL: https://ieeexplore.ieee.org/abstract/document/5170434> (Year: 2009).*

\* cited by examiner

300

Dataset 1 — 310

| Variable (311) | Value (313) | Logit (315) |
|---|---|---|
| 1 | 0 | -3.2 |
| 2 | 4 | -1.4 |
| ... | ... | ... |
| M | 5 | -1.2 |

Outcome score    -5.1
317

Dataset 2 — 320

| Variable (311) | Value (313) | Logit (315) |
|---|---|---|
| 1 | 7 | -2.7 |
| 2 | -7 | -2.3 |
| ... | ... | ... |
| M | 3 | -1.2 |

Outcome score    -3.1
327

• • •

Dataset N — 330

| Variable (311) | Value (313) | Logit (315) |
|---|---|---|
| 1 | 6 | -3.6 |
| 2 | 8 | -0.4 |
| ... | ... | ... |
| M | null | -4.3 |

Outcome score    -7
339

FIG. 3

Variable 1

| Dataset | Value | Logit |
|---|---|---|
| 1 | 0 | -3.2 |
| 2 | 7 | -2.7 |
| ... | ... | ... |
| N | 6 | -3.6 |

Variable 2

| Dataset | Value | Logit |
|---|---|---|
| 1 | 4 | -1.4 |
| 2 | -7 | -2.3 |
| ... | ... | ... |
| N | 8 | -0.4 |

• • •

Variable M

| Dataset | Value | Logit |
|---|---|---|
| 1 | 5 | -1.2 |
| 2 | 3 | -1.2 |
| ... | ... | ... |
| N | null | -4.3 |

| Variable 1 | 611 | 613 | 615 |
|---|---|---|---|
| Possible Values | Count | Cum. Dist. | |
| 0 | 100 | 0.95% | |
| 1 | 900 | 9.52% | |
| 2 | 1000 | 19.05% | |
| ... | ... | ... | |
| 19 | 500 | 90.48% | |
| 20 | 500 | 95.24% | |
| null | 500 | 100.00% | |
| total | 10500 | | |

619, 617

| Variable 2 | 611 | 613 | 615 |
|---|---|---|---|
| Possible Values | Count | Cum. Dist. | |
| -8 | 300 | 2.86% | |
| -7 | 400 | 6.67% | |
| -6 | 250 | 9.05% | |
| ... | ... | ... | |
| 7 | 600 | 89.52% | |
| 8 | 700 | 96.19% | |
| null | 400 | 100.00% | |
| total | 10500 | | |

• • •

630

| Variable M | 611 | 613 | 615 |
|---|---|---|---|
| Possible Values | Count | Cum. Dist. | |
| 0 – 0.9 | 1030 | 9.81% | |
| 0.91 – 1.5 | 1030 | 19.62% | |
| 1.51 – 4.3 | 1030 | 29.43% | |
| ... | ... | ... | |
| 8.1 – 8.4 | 1030 | 88.29% | |
| 8.41 – 10 | 1030 | 98.10% | |
| null | 200 | 100.00% | |
| total | 10500 | | |

| | Variable | Bucket | Min Value | Max Value | Mean Logit |
|---|---|---|---|---|---|
| 711 | | | | | |
| 713 | 1 | 1 | 0 | 1 | -2.1 |
| | 1 | 2 | 2 | 2 | -2.2 |
| | ... | ... | ... | ... | ... |
| 715 | 1 | 10 | 19 | 20 | -3.8 |
| 717 | 1 | null | | | -2.6 |
| | 2 | 1 | -8 | -6 | -3.6 |
| | 2 | 2 | -5 | -4 | -4.6 |
| | ... | ... | ... | ... | ... |
| | 2 | 10 | 8 | 8 | -4.3 |
| | 2 | null | | | -3.8 |
| | ... | ... | ... | ... | ... |
| | M | 1 | 0 | 0.9 | -1.4 |
| | M | 2 | 0.91 | 1.5 | -0.4 |
| | ... | ... | ... | ... | ... |
| | M | 10 | 8.41 | 10 | -2.1 |
| | M | null | | | -3.9 |

Columns: 701, 703, 705, 707, 709

| Variable | Bucket | Min Value | Max Value | Mean Logit | Rank |
|---|---|---|---|---|---|
| 1 | 1 | 0 | 1 | -2.1 | 13 |
| 1 | 2 | 2 | 2 | -2.2 | 15 |
| ... | ... | ... | ... | ... | ... |
| 1 | 10 | 19 | 20 | -3.8 | 78 |
| 1 | null | | | -2.6 | 24 |
| 2 | 1 | -8 | -6 | -3.6 | 56 |
| 2 | 2 | -5 | -4 | -4.6 | 5 |
| ... | ... | ... | ... | ... | ... |
| 2 | 10 | 8 | 8 | -4.3 | 84 |
| 2 | null | | | -3.8 | 78 |
| ... | ... | ... | ... | ... | ... |
| M | 1 | 0 | 0.9 | -1.4 | 5 |
| M | 2 | 0.91 | 1.5 | -0.4 | 1 |
| ... | ... | ... | ... | ... | ... |
| M | 10 | 8.41 | 10 | -2.1 | 13 |
| M | null | | | -3.9 | 80 |

Dataset 1 /1010

| Variable | Value | Bucket | Rank | Final Rank |
|---|---|---|---|---|
| 1 | 0 | 1 | 13 | 7 |
| 2 | 4 | 7 | 34 | 16 |
| ... | ... | ... | ... | ... |
| M | 5 | 5 | 45 | 40 |

Dataset 2 /1020    /1021   /1022

| Variable | Value | Bucket | Rank | Final Rank |
|---|---|---|---|---|
| 1 | 7 | 4 | 9 | 2 |
| 2 | -7 | 1 | 56 | 35 |
| ... | ... | ... | ... | ... |
| M | 1 | 2 | 1 | 1 |

⋮

Dataset P /1030

| Variable | Value | Bucket | Rank | Final Rank |
|---|---|---|---|---|
| 1 | 6 | 4 | 60 | M-10 |
| 2 | 8 | 10 | 84 | M |
| ... | ... | ... | ... | ... |
| M | null | "null" | 80 | M-1 |

FIG. 10

| Variable | Variable Definition | Turn Down Reason |
|---|---|---|
| SML | Sum of monthly payments for all open Mortgage trade lines | Amount of payment(s) on installment account(s) |
| NAFI | Number of Auto Finance Inquiries | Number of recent inquires |
| NOR | Number of months since opened date on most recent Revolving trade line | Age of newest revolving account |
| SAF | Sum of balances for all open Auto Finance trade lines | Installment account balance(s) are too low |
| NAFT | Number of Auto Finance trade lines ever. | Number of installment accounts |
| NET | Number of Education trade lines ever. | Number of installment accounts |
| NFCT | Number of Finance Company trade lines ever. | Number of personal finance loan(s). |
| NIT | Number of Installment trade lines ever. | Number of installment accounts |
| NRT | Number of Revolving trade lines ever. | Number of new revolving accounts |

FIG. 11

SYSTEMS AND METHODS FOR DETERMINING RELATIVE IMPORTANCE OF ONE OR MORE VARIABLES IN A NON-PARAMETRIC MACHINE LEARNING MODEL

TECHNICAL FIELD

The present disclosure generally relates to computerized methods and systems for evaluating outcomes of a machine learning model and determining relative importance of one or more variables that led to the outcomes. More particularly, embodiments of the present disclosure relate to inventive and unconventional systems for determining relative importance of the one or more variables when an inner algorithm of a machine learning model is highly complicated, such as a non-parametric model.

BACKGROUND

Statistical models define relationships between one or more dependent variables and one or more independent variables. For example, a statistical model may be defined in order to define a relationship between a consumer's likelihood to purchase a product given one or more independent variables, such as the consumer's income level and/or education. And once the statistical model is defined, it may be used to determine the dependent variables based on a set of given independent variables. Statistical models can also be used for other purposes, such as analyzing interest rates, predicting the future price of a stock or estimating risk associated with consumer loans or financing.

Basic forms of statistical models include regression types such as linear regression, logistic regression, and polynomial regression. These regression models use a finite number of independent variables to determine dependent variables and predict an outcome based on the determined dependent variables. There is a limit, however, to how many independent variables can be used to determine the dependent variables. The limits may include complexity of the model, available computational capacity, and the like.

Generally, independent variables selected for a model will have some relationship or correlation to the dependent variable(s). Further, some independent variables may be found to have a greater relationship or correlation to a dependent variable. For instance, to predict a consumer's likelihood to purchase a product, independent variables such as the consumer's income level or education may be more significant than other variables such as the consumer's social media status. Developing a more complex model by including in more independent variables may lead to more accurate outcomes, but there are diminishing returns once the significant independent variables are included in and some of the less significant independent variables begin to be added to the model. Processing these additional less significant independent variables may lead to unnecessary expenditure of computing resources, increased processing time, and the like.

As more data became readily available with the advancement of modern computing and information technology, however, needs arose to leverage much more available data. As such, regression type models have become relatively less accurate because they can only consider a fixed set of independent variables in determining an outcome. On the other hand, non-parametric machine learning models are gaining popularity, based on the consideration that some outcomes (i.e., dependent variable) may not be defined in terms of a finite set of independent variables. Machine learning models include non-parametric models that can be defined by an infinite number of independent variables, allowing businesses and researchers to utilize more sets of data available to them and model more complicated relationships with little to no constraints. Examples of non-parametric models include gradient boosting machine, k-nearest neighbors (kNN), and support vector machines (SVM).

However, the relationships defined by non-parametric models are largely unknown. For example, a non-parametric model could use many different independent variables to determine a consumer's likelihood to purchase a product with significant accuracy, but a user may not be able to understand which of the many independent variables were the most significant in determining the likelihood. Knowledge of the most significant variables like these may be important, for example, for retailers in focusing their marketing efforts. Simply put, knowing which of the independent variables are important in determining an outcome may allow systems, organizations, or individuals to focus their resources on specific components of a process or a system towards a more favorable outcome.

SUMMARY

One aspect of the present disclosure is directed to a system for determining relative importance of one or more variables in a non-parametric model. The system comprises: at least one database for storing raw values for the variables; at least one non-transitory computer-readable medium configured to store instructions; and at least one processor configured to execute the instructions to perform operations. The operations comprise: receiving, from the at least one database, the raw values of the variables corresponding to one or more entities; processing the raw values of the variables for the entities using the statistical model to obtain probability values for the variables and an overall prediction value for each entity; determining a plurality of cumulative distributions for the variables based on the raw values and the number of entities having a specific raw value; grouping the variables into a plurality of equally sized buckets based on the cumulative distributions; determining a mean probability value for each bucket; assigning a rank number for each bucket based on the mean probability values; compiling a table for the entities based on the raw values and the buckets corresponding to the raw values; and determining the relative importance of the variables for the entities based on the rank numbers.

Another aspect of the present disclosure is directed to a method for determining relative importance of one or more variables in a statistical model. The method comprises: receiving, from the database, the raw values of the variables corresponding to one or more entities; processing the raw values of the variables for the entities using the statistical model to obtain probability values for the variables and an overall prediction value for each entity; determining a plurality of cumulative distributions for the variables based on the raw values and the number of entities having a specific raw value; binning the variables into a plurality of equally sized buckets based on the cumulative distributions; determining a mean probability value for each bucket; assigning a rank number for each bucket based on the mean probability values; compiling a table for the entities based on the raw values and the buckets corresponding to the raw values; and determining the relative importance of the variables for the entities based on the rank numbers.

Yet another aspect of the present disclosure is directed to a system for identifying one or more reasons that influence an outcome of one or more loan applications. The system comprises: at least one database for storing raw values for one or more variables corresponding to a plurality of individuals; at least one non-transitory computer-readable medium configured to store instructions; and at least one processor configured to execute the instructions to perform operations. The operations comprise: receiving, from the database, the raw values of the variables corresponding to one or more applicants among the plurality of individuals; processing the raw values of the variables for the applicants using a statistical model to obtain probability values and an overall prediction value, the probability values indicating a first degree of risk for a corresponding loan application based on specific variable and the overall prediction value indicating a second degree of risk for the corresponding loan application based on the variables; determining a plurality of cumulative distributions for the variables based on the raw values and the number of entities having a specific raw value; binning the variables into a plurality of equally sized buckets based on the cumulative distributions; determining a rank number for each bucket based on the probability values of the variables associated with each bucket; and when the overall prediction value is higher than a predetermined threshold, determining one or more most important variables for the corresponding loan application based on the rank numbers; identifying one or more reasons associated with the most important variables; and generating a report based on the reasons.

Other systems, methods, and computer-readable media are also discussed herein.

BRIEF DESCRIPTION OF THE DRAWINGS

FIG. 3 is a set of exemplary tables of values included in preprocessed datasets, consistent with disclosed embodiments.

FIG. 5 is a set of exemplary tables of values resulting from datasets being restructured based on variables, consistent with disclosed embodiments.

FIG. 6 is a set of exemplary tables of cumulative distribution for the variables, consistent with disclosed embodiments.

FIG. 7 is an exemplary master table of values in which the datasets and the cumulative distribution are consolidated, consistent with disclosed embodiments.

FIG. 8 is an exemplary table of values including relative importance of each variable, consistent with disclosed embodiments.

FIG. 10 is a set of exemplary tables of values restructured back again based on datasets with corresponding relative importance of each variable, consistent with disclosed embodiments.

FIG. 11 is an exemplary table of information describing a meaning of each variable, consistent with an exemplary application of disclosed embodiments.

DETAILED DESCRIPTION

Figure 1:
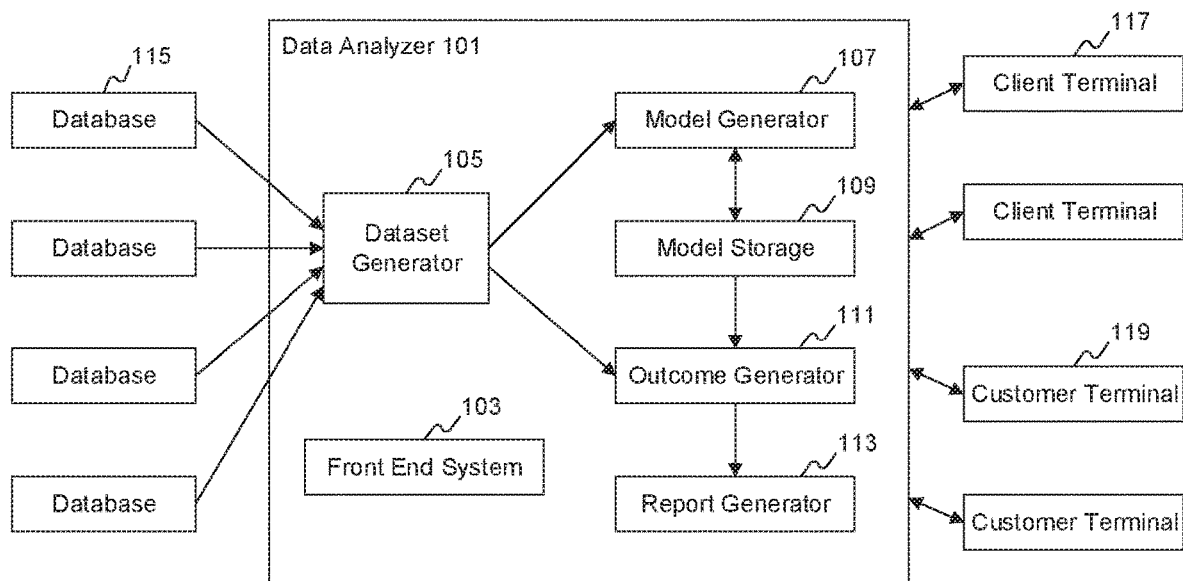
FIG. 1 is a schematic block diagram illustrating an exemplary embodiment of a networked environment comprising computerized systems for analyzing data using a statistical model and determining relative importance of variables, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure can be used to understand internal processes of non-parametric machine learning models, which have previously been unknown. In particular, embodiments of the present disclosure can identify relative importance of variables that a machine learning model considers in determining an outcome for particular datasets. Furthermore, embodiments of the present disclosure may be applicable to any non-parametric machine learning model, because the embodiments determine the relative importance independent of the actual mathematical processes that drive the non-parametric machine learning models. In some embodiments, datasets may comprise unstructured data, such as one or more JSON (JavaScript Object Notation) objects, one or more delimited files (e.g., comma-separated value (CSV) files or the like), or the like, or structured data, such as one or more relational data structures (e.g., tabular data or the like), one or more graphical data structures, or the like.

FIG. 1 depicts an exemplary embodiment of a networked environment 100 comprising computerized systems for analyzing datasets using a statistical model and determining relative importance of variables contained in datasets. Environment 100 may include a variety of systems, each of which may be connected to one another via one or more networks. The systems may also be connected to one another via a direct connection, for example, using a cable. The depicted systems include a data analyzer 101, one or more databases 115, one or more client terminals 117, and one or more customer terminals 119.

Data analyzer 101, in some embodiments, may be implemented as a computer system that collects data and analyzes the data using a statistical model. Data analyzer 101 may also transmit, via a front end system 103, results of the analysis or a report to client terminal(s) 117 or customer terminal(s) 119. In some embodiments, data analyzer 101 comprises front end system 103, a dataset generator 105, a model generator 107, an model storage 109, an outcome generator 111, and a report generator 113.

In some embodiments, data analyzer 101 may comprise one or more processors, one or more memories (i.e., non-transitory computer-readable media), and one or more input/output (I/O) devices. Data analyzer 101 may take the form of a server, general-purpose computer, a mainframe computer, a special-purpose computing device such as a graphical processing unit (GPU), laptop, smartphone, mobile device, or any combination of these computing devices. In these embodiments, components of data analyzer 101 (i.e., front end system 103, dataset generator 105, model generator 107, model storage 109, outcome generator 111, and report generator 113) may be implemented as one or more functional units performed by one or more processors based on instructions stored in one or more memories. Data analyzer 101 may be a standalone system, or it may be part of a subsystem, which may be part of a larger system.

Alternatively, components of data analyzer 101 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, smartphone, mobile device, or any combination of these computing devices.

Front end system 103, in some embodiments, may be implemented as a computer system that enables external users to interact with one or more components of data analyzer 101. For example, in embodiments where data analyzer 101 enables users to request data analysis using a statistical model, front end system 103 may be implemented as a web server that receives such requests and presents outcome of the analysis. In some embodiments, front end system 103 may be implemented as a computer or computers running software such as the Apache HTTP Server, Microsoft Internet Information Services (IIS), NGINX, or the like. In other embodiments, front end system 103 may run custom web server software designed to receive and process requests from external devices (e.g., client terminals 117 or customer terminals 119), instruct other systems to acquire information from databases, run analysis, and provide responses to the received requests based on the acquired information.

Dataset generator 105, in some embodiments, may include one or more computing devices configured to retrieve data from one or more databases 115 in response to an analysis request received via front end system 103. In some embodiments, dataset generator 105 may also be configured to preprocess the retrieved data for generating a statistical model via model generator 107 or for analysis via outcome generator 111. The preprocessing functions of dataset generator 105 are described in more detail below with respect to FIGS. 2 and 3.

Model generator 107, in some embodiments, may include one or more computing devices configured to generate a statistical model or a rank of score averages (ROSA) table. In some embodiments, the statistical models may include different types of machine learning non-parametric models such as gradient boosting machine, k-nearest neighbors (kNN), support vector machines (SVM), and the like. Generated statistical models and ROSA tables may be stored in model storage 109 as described below.

In some embodiments, model generator 107 may generate new statistical models that are not trained yet or update existing statistical models from model storage 109 using a set of preprocessed data from dataset generator 105. The desired type of statistical model to generate or the specific model from model storage 109 to update may be selected by a user via front end system 103 using any of client terminals 117 or customer terminals 119. Additionally or alternatively, model generator 107 may generate a ROSA table for any particular statistical model stored in model storage 109. A ROSA table may store a list of variables and their buckets along with information on the relative importance of each bucket, which may be determined based on processes described below with respect to FIGS. 4-8. In some embodiments, a ROSA table may be unique to each statistical model and its version, and model generator 107 may update a corresponding ROSA table each time a statistical model is generated or updated. Once a model or a ROSA table is generated, model generator 107 may transmit it to model storage 109 for storage.

Model storage 109, in some embodiments, may include one or more databases or memories configured to store statistical models and corresponding ROSA tables for analysis of data generated by dataset generator 105. Model storage 109 can include cloud-based databases (e.g., AMAZON WEB SERVICES S3 buckets) or on-premises databases. In some embodiments, model storage 109 may comprise one or more hard disk drives, one or more solid state drives, or one or more non-transitory memories. Alternatively or additionally, model storage 109 can be configured to provide information regarding available statistical models to an external user via front end system 103.

Outcome generator 111, in some embodiments, may include one or more computing devices configured to process one or more datasets generated by dataset generator 105 to determine a likelihood of an outcome or to determine relative importance of variables within a particular dataset. In one aspect, outcome generator 111 may input a dataset into a statistical model retrieved from model storage 109 in order to determine a likelihood of an event occurring given the values specified by the dataset. In another aspect, outcome generator 111 may input a dataset into a ROSA table of a particular statistical model to determine relative importance of variables included in the dataset in determining the corresponding likelihood. The functions of outcome generator 111 is described below in more detail with respect to FIG. 9.

Report generator 113, in some embodiments, may include one or more computing devices configured to generate a report based on the analysis results from outcome generator 111. The report may include one or more of indications of the outcome from model generator 107, relative importance of variables from the analysis results of outcome generator 111, a predetermined number of the most important variables, explanations of what the variables signify, suggestions on how to improve the variables, and the like. In some embodiments, report generator 113 may transmit the report to one or more of client terminals 117 and/or customer terminals 119 via the web or a software interface enabled by front end system 103. Alternatively or additionally, report generator 113 may generate physical documents based on the report to be forwarded to a customer or a client.

Databases 115, in some embodiments, may store information on one or more elements, which may have been collected and accrued over time. In some embodiments, databases 115 may comprise one or more hard disk drives, one or more solid state drives, or one or more non-transitory memories. The information may be organized into one or more sets of data (i.e., datasets), such that information pertaining to each element is grouped into one dataset. In some embodiments, each dataset may be indexed by a unique identifier so that a particular dataset can be easily retrieved. Each dataset may comprise a predetermined set of variables and their corresponding raw values. For example, one database may include information on individuals' financial accounts, where all information pertaining to one individual is grouped into one dataset and where the database contains one or more datasets respectively pertaining to multiple individuals. In some embodiments, some of the variables may not have any value assigned to them, in which case a value of "null" may be assigned to the variables.

In some embodiments, each database among one or more databases 115 may include different datasets comprising non-identical groups of variables. Furthermore, each of databases 115 may include information on non-identical sets of entities. For example, two databases may both contain information on individuals' credit history and the datasets of the two databases may share one or more common variables. However, the dataset of one database may also include one or more variables that the dataset of the other database does not include, and vice versa. Furthermore, one database may contain information on one group of individuals that may or may not include one or more individuals included in the other database. In some embodiments, datasets included in different databases 115 may have different data structures. For example, datasets of different databases 115 may comprise unstructured data, such as one or more JSON (JavaScript Object Notation) objects, one or more delimited files (e.g., comma-separated value (CSV) files or the like), or the like, or structured data, such as one or more relational data structures (e.g., tabular data or the like), one or more graphical data structures, or the like.

Still further, one or more of databases 115 may be external databases owned and operated by a third-party data collection agency different from a party operating data analyzer 101. For example, one or more of databases 115 may be databases of credit bureaus such as Equifax, Experian, and TransUnion. Additionally or alternatively, databases 115 may include internal databases (owned and operated by the same party that operates data analyzer 101) configured to store data from the external databases so that the same data does not need to be retrieved multiple times.

Client terminals 117 and customer terminals 119, in some embodiments, may include one or more computing devices configured to enable clients or customers to access data analyzer 101 via front end system 103. Client terminals 117 and customer terminals 119 may include any combination of computing devices such as personal computers, mobile phones, smartphones, PDAs, or the like. In some embodiments, clients or customers may use client terminals 117 or customer terminals 119, respectively, to access a web interface provided by front end system 103 and submit a request for data analysis. Additionally or alternatively, clients or customers may use client terminals 117 or customer terminals 119, respectively, to receive information on available models from model storage 109, analysis results from outcome generator 111, or reports from report generator 113 via the web interface provided by front end system 103.

In some embodiments, datasets of different databases 115 may be formatted differently or have different data structures, as described above. Therefore, dataset generator 105 may need to preprocess the data retrieved from databases 115 so that all datasets can be used to determine outcomes and analysis results in response to clients' or customers' requests.

Figure 2:
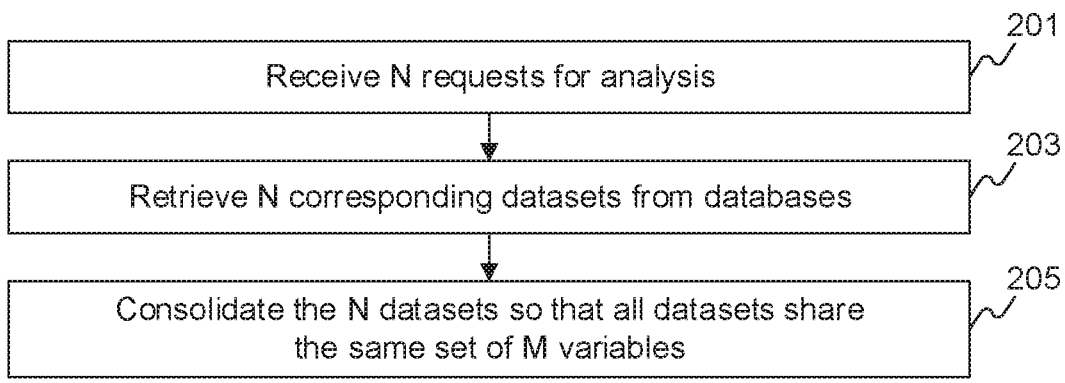
FIG. 2 depicts a flowchart of an exemplary computerized process for preprocessing data, consistent with disclosed embodiments.

FIG. 2 depicts a flowchart of an exemplary computerized process 200 for preprocessing data. Process 200 may be performed, for example, when data analyzer 101 receives and collects N number of requests for analysis at step 201 from clients or customers via front end system 103 as described above. Each request may comprise identifying information relating to a particular element included in one or more databases 115. For example, the identifying information may include an individual's social security number or other unique information about the particular element so that dataset generator 105 can identify the dataset corresponding to the particular element among one or more datasets stored in one of databases 115. In some embodiments, each request may also include a specific window of time (e.g., between year 2000 and 2019, past 6 months, etc.) or dataset generator 105 may specify a predetermined window of time so that only the datasets that fall within the window of time may be retrieved.

Additionally or alternatively, each request may comprise another identifying information relating to a particular model stored in model storage 109. The identifying information may comprise an explicit selection such as a selection from a drop-down list of available models or an indirect selection such as a description of what the requesting party wishes to determine. In case of an indirect selection, model storage 109 may be configured to automatically select an appropriate model based on one or more keywords or a predefined mapping between each model and its use.

At step 203, dataset generator 105 retrieves N number of datasets from one or more databases 115 corresponding to N requests received at step 201. In some embodiments, dataset generator 105 may identify the corresponding datasets from databases 115 by utilizing a search function implemented in each database. The search function may receive the identifying information from the requests as input and provide the corresponding dataset(s) as output.

In some embodiments, multiple databases may contain datasets corresponding to the same element, and one or more databases may contain datasets for certain elements while other databases may not. For example, two databases may each contain datasets for element X, while only one of the two contains a dataset for element Y. Therefore, data generator 105 may retrieve and store datasets from each database in separate groups, preventing datasets from one database from getting mixed with datasets from other databases.

Also, in some embodiments, data generator 105 may include an error detection function configured to identify instances where a particular one of databases 115 does not contain a dataset corresponding to a request. Data generator 105 may then return an error message to the corresponding client terminal(s) 117 or customer terminal(s) 119 from which the request came, so that the client or the customer may submit a corrected request or cancel the request.

At step 205, data generator 105 consolidates the N datasets retrieved from each of databases 115 so that all datasets share the same set of M variables. Specifically, once all corresponding datasets are retrieved, data generator 105 may parse the incoming data and store them in a standardized data structure readable by models stored in model storage 109. For example, a dataset from one of databases 115 may comprise variables X, Y, and Z while a dataset from another one of databases 115 may comprise variables X, Y, A, and B. Dataset generator 105 may then convert the datasets into a standardized data structure comprising variables X, Y, A, B, and Z. Alternatively, data generator 105 may convert the datasets to fit a standardized data structure comprising a predetermined set of variables regardless of the variables included in each dataset. In such embodiments, any variable included in a dataset but not in the standardized data structure may be discarded while any variable not included in a dataset but included in the standardized data structure may be assigned a value of null.

FIG. 3 depicts tables 300 of exemplary values for N datasets after going through preprocessing steps of process 200. In this example, datasets 1 through N (i.e., tables 310-330) contain M number of variables, numbered 1 through M at column 311, along with corresponding values at column 313. In one aspect, datasets 1 through N may be used by model generator 107 to train a statistical model or to generate a ROSA table. The process of generating a ROSA table is described below with respect to FIGS. 4-8. In another aspect, the datasets may be used by outcome generator 111 to input each dataset to a trained statistical model from model storage 109 and determine a probability of an event given the particular dataset, or to determine relative importance of each variable within each dataset given a particular ROSA table. The process of determining relative importance is described below with respect to FIGS. 9 and 10.

In some embodiments, each of the N datasets may also comprise logit values as shown in column 315 and an outcome score 317, corresponding to outcomes from processing each dataset through a statistical model. As used herein, logit values refer to unnormalized or raw predictions or probability values of a model as known in the art. For example, a logit value may be expressed as $$\ln\left(\frac{P}{1-P}\right),$$

where P is a probability that a particular event will occur.

More specifically, given the N datasets from data generator 105 and a particular statistical model from model storage 109, model generator 107 may process the datasets through the statistical model to generate N sets of M logit values (e.g., column 315 of FIG. 3) and N outcome scores. In some embodiments, model generator 107 may determine a logit value for a variable having a value of null, as shown in a cell 339.

An outcome score determined by model generator 107 (e.g., outcome score 317) may be representative of the probability of a desired outcome occurring given a particular dataset. For example, a model trained to determine whether a loan application will result in a delinquent account may output an outcome score indicative of the probability of the loan application resulting in a delinquent account given a particular dataset as input. Referring to the exemplary values in FIG. 3, a first outcome score 317 of −5.1 is based on the probability of a desired outcome occurring given dataset 1, a second outcome score 327 of −3.1 is based on the probability given dataset 2, and so on.

Outcomes of a statistical model such as first outcome score 317, however, are only indicative of final determinations of the statistical model. And as described above, not much else is known in terms of how the statistical model determined the outcome or what aspect (e.g., variable) of a particular dataset contributed the most to the outcome. Additional steps of determining the relative importance of variables are now described below.

Figure 4:
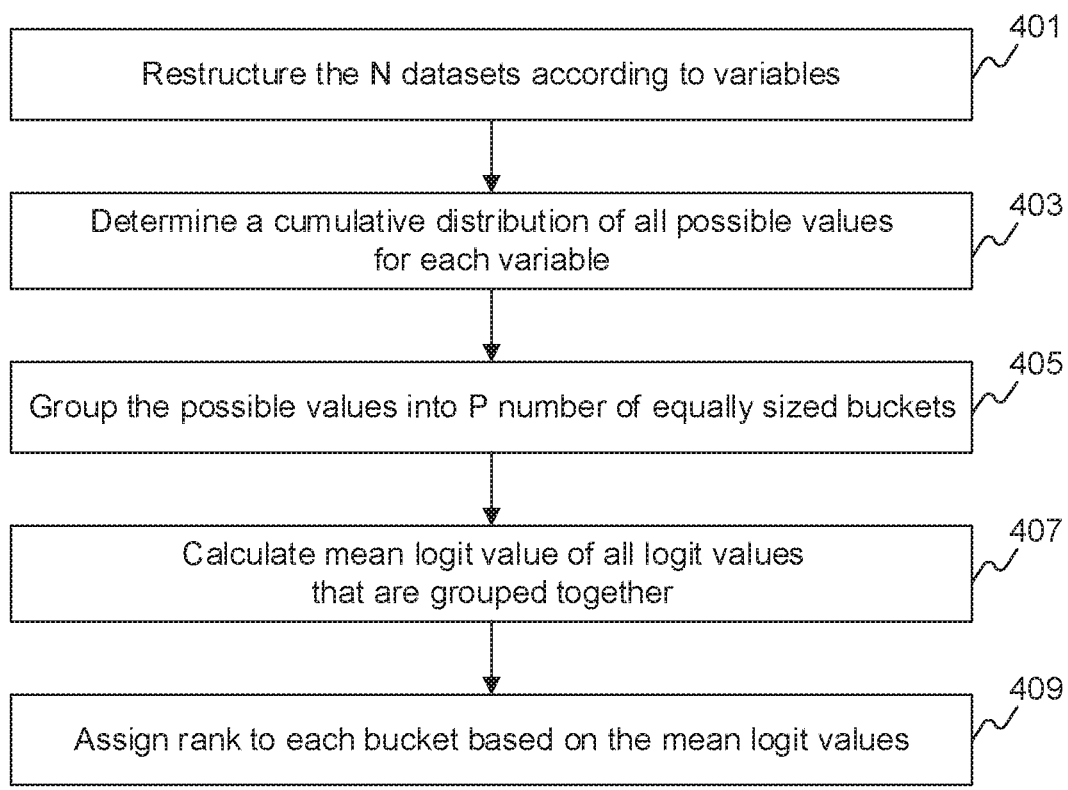
FIG. 4 depicts a flowchart of an exemplary computerized process for determining relative importance of variables for a statistical model, consistent with disclosed embodiments.

FIG. 4 depicts a flowchart of an exemplary computerized ROSA generation process 400 for determining relative importance of variables for a particular statistical model. ROSA generation process 400 may be performed by model generator 107 based on datasets from dataset generator 105 and a particular model from model storage 109. ROSA generation process 400 is explained below with reference to FIGS. 5-8 for clarity. More particularly, FIG. 5 is a set of exemplary tables of values resulting from datasets being restructured based on variables; FIG. 6 is a set of exemplary tables of cumulative distribution for the variables; FIG. 7 is an exemplary master table of values in which the datasets and the cumulative distribution are consolidated; FIG. 8 is an exemplary ROSA table 800, which includes relative importance of each variable in addition to the master table of values from FIG. 7.

At step 401, model generator 107 restructures the N datasets with corresponding logit values based on variables as shown, for example, in FIG. 5. Here, N tables of datasets each comprising M rows of variables (FIG. 3) are restructured by model generator 107 into M tables of variables each comprising N rows of datasets (FIG. 5). In some embodiments, step 401 may only involve rearrangement of variables and datasets without any alteration of corresponding values. For example, the value of 0 and logit value of −3.2 for variable 1 of dataset 1 in FIG. 3 are found in the first row of the table (under the headings) for variable 1 in FIG. 5; and the value of 3 and logit value of −1.2 for variable M of dataset 2 in FIG. 3 are found in the second row of the table for variable M in FIG. 5. Although the datasets are depicted as multiple tables here for ease of understanding, other arrangements of data are equally applicable, such as a three-dimensional matrix, multiple arrays, and the like.

At step 403, model generator 107 determines cumulative distribution of the M variables based on each of their possible values. For example, as shown in column 611 of FIG. 6, possible values of variable 1 comprise integers from 0 to 20. Similarly, possible values of variable 2 comprise integers between −8 and 8, and those of variable M comprise any value between 0 and 10. Column 613 indicates the number of datasets among the N datasets that have a particular value for the corresponding variable. For example, in FIG. 6, 100 out of N datasets have a value of 0 for variable 1. Similarly, 700 out of N datasets have a value of 8 for variable 2, and 1030 out of N datasets have a value between 8.1 and 8.4 for variable M. In this example, there are 10500 datasets because a total count 617 is 10500 (i.e., N=10500). Column 615 indicates the cumulative distribution of datasets having a particular value or less for the corresponding variable. For example, in FIG. 6, 0.95% of the N datasets (i.e., 100 datasets) have the value of 0 for variable 1. Similarly, 19.05% of the N datasets (i.e., 2000 datasets) have the value of 2 or less for variable 1. In some embodiments, the number of datasets without a value (i.e., having a value of null) for a variable may be counted separately from the other possible values, as shown in row 619.

In some embodiments where a variable can have any value between two numbers, the possible values can be divided into a predetermined number of ranges so that the number of datasets with a value that fall between each range is equal, as shown in table 630.

At step 405, model generator 107 groups the possible values into P number of equally sized buckets. For example, if P is 10, as in FIG. 6, possible values 0 and 1 of variable 1 would be grouped into bucket 1, because their cumulative distribution is 9.52%, which is approximately ¹⁄₁₀ of N datasets with a value for variable 1 (i.e., (10500−500)/10). Similarly, possible value 2 of variable 1 would be grouped into bucket 2, because it alone includes enough datasets to make up another ¹⁄₁₀ of N datasets. In some embodiments where a variable may have any value within a range, as in table 630 of FIG. 6, the possible values can be divided into P number of ranges so that each range includes the same distribution of datasets. Furthermore, in some embodiments, the datasets without a value for a particular variable may be grouped into their own bucket, as shown in row 715 of FIG. 7, regardless of the bucket's size.

FIG. 7 depicts master table 700 of M variables with their P+1 buckets (because those with value of null are counted separately). In master table 700, the M variables (column 701) and their buckets (column 703) are shown in one long table. Rows 711 and 713 show buckets 1 and 2 of variable 1 described above. Specifically, bucket 1 of variable 1 contains possible values of 0 and 1 as shown in columns 705 and 707, respectively, while bucket 2 of variable 1 only contains a possible value of 2.

At step 407, model generator 107 calculates a mean logit value from all datasets included within each bucket. For example, a mean logit value of −3.6 in column 709 and row 717 of table 700 indicates that the average of all logit values corresponding to the datasets with values that fall between −8 and −6 for variable 2 is −3.6.

At step 409, model generator 107 assigns a rank to each bucket based on the mean logit values. The ranks may be based on a comparison of all M×(P+1) number of buckets. In some embodiments, assigning the ranks may comprise numbering each bucket sequentially or sorting the buckets in sequence based on the mean logit values in an ascending or a descending order as shown in column 801 of FIG. 8.

Next, model generator 107 may transmit the finished table (e.g., table 800 of FIG. 8) to model storage 109 as a ROSA table to be stored along with other statistical models and corresponding ROSA tables. Outcome generator 111 may retrieve any of the ROSA tables at a later time to determine relative importance of each variable given a particular dataset from dataset generator 105.

Figure 9:
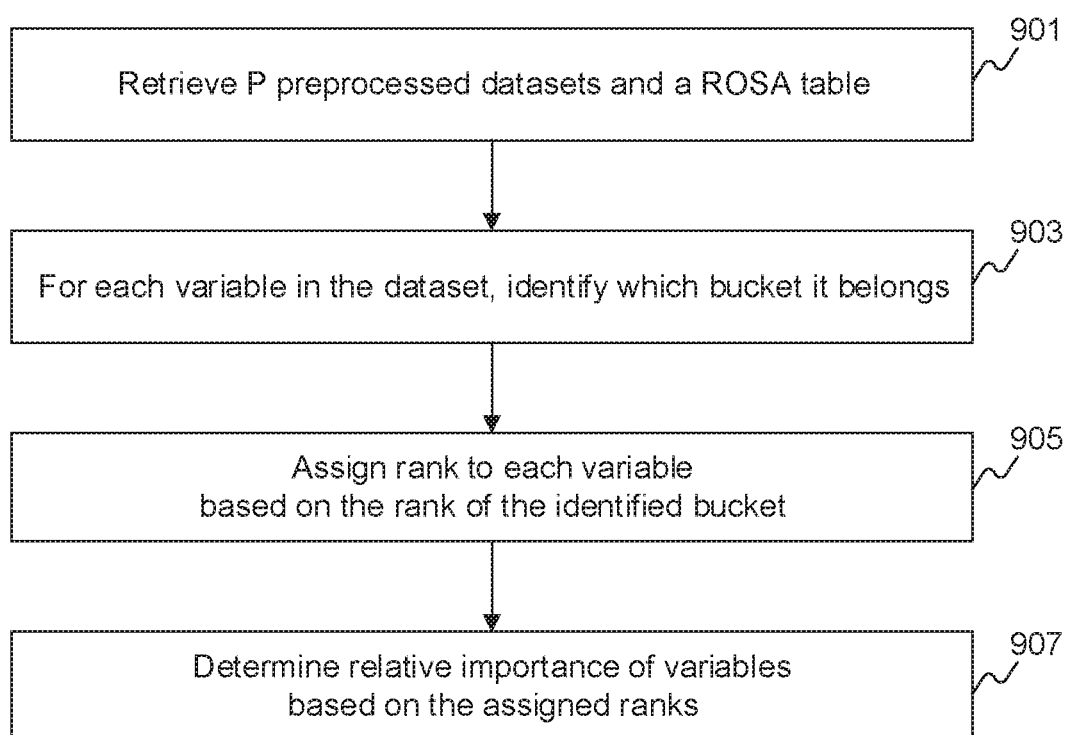
FIG. 9 depicts a flowchart of an exemplary computerized scoring process for determining relative importance of variables within a dataset, consistent with disclosed embodiments.

FIG. 9 depicts a flowchart of an exemplary computerized ROSA scoring process 900 for determining relative importance of variables within a particular dataset. ROSA scoring process 900 may be performed by outcome generator 111 based on a ROSA table generated by model generator 107 and retrieved from model storage 109 and any dataset received from dataset generator 105. FIG. 10 is a set of exemplary tables of values showing new datasets 1 through P with bucket and relative importance of each variable within each dataset as determined as a result of ROSA scoring process 900.

At step 901, outcome generator 111 retrieves P preprocessed datasets from dataset generator 105 and a ROSA table from model storage 107 in response to one or more analysis requests from one or more client terminals 117 or one or more customer terminals 119. As described above with respect to FIG. 2, the analysis requests may comprise identifying information relating to one or more particular element in databases 115 and/or a desired statistical model and its corresponding ROSA table. The datasets 1 through P may comprise one or more new datasets that were not used to train a statistical model or generate a ROSA table via model generator 107.

At steps 903 and 905, outcome generator 111 identifies, for each variable in each dataset, a bucket that it belongs to and the corresponding rank based on its respective value and the retrieved ROSA table. For example, given ROSA table 800 of FIG. 8 and table 1010 of FIG. 10 for dataset 1, outcome generator 111 would identify that the value of 0 for variable 1 in dataset 1 belongs to bucket 1 of variable 1 in ROSA table 800. Outcome generator 111 would also determine that bucket 1 of variable 1 corresponds to rank 13. Similarly, outcome generator 111 would identify that the value of null for variable M in table 1030 belongs to bucket "null" of variable M in ROSA table 800 with a rank of 80. In some embodiments, steps 903 and 905 may be performed by an iterative process that determines where a value of a particular variable falls given the minimum and maximum values assigned to a bucket for the variable. Such process may utilize any suitable method known in the art such as a lookup table, linear search, binary search, or the like.

At step 907, outcome generator 111 determines relative importance of the variables within each dataset based on the ranks. In some embodiments, outcome generator 111 may determine the relative importance (i.e., final rank column 1022) by sorting the variables within each dataset based on the assigned ranks. For example, for table 1020 of FIG. 10, outcome generator 111 determines, based on the assigned ranks 1021, that variable M has the highest rank, 1, and that variable 1 has the next highest rank, 2. Similarly, for table 1030, outcome generator 111 determines that variable 2 has the lowest rank among M number of variables and assigns a final rank of M, and that variable M has the next lowest rank, M−1. In the illustrated example, variable 1 of table 1030 is the 11th lowest rank, M−10. The ranks of each variable within each dataset are indicated by final rank column 1022 of each table. The ranks of the variables relative to the ranks of other variables in a dataset may directly correlate to the relative importance. For example, for dataset 1, variable 1 may be more important in determining the outcome score (i.e., the probability of an event occurring as explained above with respect to FIG. 3) than variables 2 and M. Similarly, for dataset 2, variable M may be more important than variable 2. The final ranks of one dataset may be independent of those in another dataset, which means, for example, that the final rank of 1 for variable M in dataset 2 has no effect on or relevance to the final rank of variable M in dataset 1.

In some embodiments, outcome generator 111 may also select a predetermined number of variables with the highest ranks for one or more datasets and transmit them to report generator 113, which may then output them to client terminal(s) 117 and/or customer terminal(s) 119 to indicate the most important variables for each dataset. In some embodiments, report generator 113 may also identify a definition or meaning for the most important variables based on, for example, a predetermined lookup table of definitions in order to facilitate understanding of the reports. As would be apparent given that final ranks of variables in each dataset are independent of each other, the most important variables for each dataset may be the same or different based solely on final ranks of the variables within each dataset.

Exemplary Application of the Disclosed Embodiments

A practical application of the disclosed embodiments is described next.

Financial institutions such as banks, credit card companies, and lending companies are frequently involved in processing loan applications (e.g., auto loan, mortgage, credit card consolidation loans). Such loan processing typically involves a customer submitting a loan application with his or her financial information. In response, the financial institution processing the loan application may retrieve credit history of the customer from credit bureaus, determine a likelihood of the customer defaulting on the loan (i.e., risk), and decide whether to accept or reject the loan application. The process of determining the risk typically involves comparing the customer's credit history with those of the customer's peers, observing an occurrence of loan defaults given a set of credit histories and predicting how the current customer's credit history compares to the pattern identified as being more likely to result in a default. This process is increasingly becoming dependent on predictive abilities of machine learning models in order to take advantage of increasingly diverse array of data collected by credit reporting agencies.

When financial institutions reject a loan application they may be legally required to provide reasons why the loan application was rejected. The reasons may include factors like insufficient installment account balance, too many recent credit inquiries, or too many new revolving accounts. Providing these reasons may become very challenging when inner algorithms of machine learning models used to judge a loan application are unknown. Without knowing which aspect of a person's credit history played a major role in the outcome of the loan application processing, the financial institutions may not be able to fulfill their legal obligations.

The process described above with respect to FIGS. 2-9 allows financial institutions to gain an insight into their machine learning models and determine major factors that led to rejecting a loan application. Referring back to FIG. 1, databases 115 may be, in this example, the three major credit bureaus (Equifax, Experian, and TransUnion). FIG. 11 is an exemplary table of information describing a meaning of each variable that may be used in this example. Specifically, FIG. 11 lists examples of variables (column 1110) that are retrieved from the credit bureaus, their definition (column 1120), and corresponding reasons for rejection (column 1130) that are provided when one of the variables is determined to have played a major role in rejecting the loan application. In some embodiments, the reasons may be added to a rejection letter for a customer by report generator 113, fulfilling the financial institution's legal obligation.

In some embodiments where a loan application is signed by a primary applicant and a secondary applicant, outcome generator 111 may choose to analyze only the dataset corresponding to the applicant with a lower outcome score as determined by processing the applicants' applications through a statistical model, because the applicant with the lower outcome score is more likely to be the one contributing more to rejection of a loan. In other embodiments, outcome generator 111 may instead analyze the datasets of both applicants. Additionally or alternatively, in some embodiments where credit history of the same person is retrieved from all three credit bureaus, resulting in three datasets for the same person, outcome generator 111 may choose to analyze only the dataset that returned the lowest outcome score. The final reasons for rejecting a loan application may be chosen based on the top most important variables identified by the disclosed processes. In other embodiments, outcome generator 111 may instead analyze all three datasets.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for determining a number of variables in a non-parametric model that influence an outcome of a loan application, the system comprising:
   at least one database for storing raw values for the variables;
   at least one non-transitory computer-readable medium configured to store instructions; and
   at least one processor configured to execute the instructions to perform operations comprising:
   receiving, from the at least one database, the raw values of the variables corresponding to one or more entities;
   processing the raw values of the variables for the entities using the non-parametric model to obtain logit prediction values for the variables;
   determining a plurality of cumulative distributions for the variables based on the logit values and the number of entities having a specific logit value;
   grouping the variables into a plurality of equally sized buckets based on the cumulative distributions;
   determining a mean logit prediction value for each bucket;
   assigning a rank number for each bucket based on the mean logit prediction values;
   compiling a rank of score averages (ROSA) table for the entities based on the logit values and the buckets corresponding to the logit values;
   determining a plurality of variables with the highest rank numbers;
   identifying a definition for each of the plurality of variables;
   generating a report based on the identified definitions; and
   declining the one or more loan applications based on the plurality of variables with the highest rank numbers,
   wherein a larger logit prediction value corresponds to a higher risk for the corresponding loan application and a higher rank number, and wherein the non-parametric model is at least one of maximum likelihood (ML), k-nearest neighbors (kNN), and support vector machines (SVM).

2. The system of claim 1, wherein there are more than one hundred different variables.

3. The system of claim 1, wherein each of the buckets correspond to at least 10% of the entities.

4. The system of claim 1, wherein the raw values received from the database comprise historical data accrued over a predetermined window of time.

5. The system of claim 1, wherein the system further comprises more than one database, and wherein the operations further comprise:
receiving the raw values from each database; and
processing the raw values from each database separately using the non-parametric model to determine the logit prediction values for the raw values received from each database.

6. The system of claim 1, wherein assigning the rank numbers for the buckets includes:
sorting the buckets in sequence based on the mean logit prediction values;
assigning the rank numbers in sequence based on the sequence of the buckets.

7. A method for determining a predetermined number of variables in a non-parametric model that influence an outcome of one or more loan applications, the method comprising:
receiving, from a database, raw values of the variables corresponding to one or more entities;
processing the raw values of the variables for the entities using the non-parametric model to obtain logit prediction values for the variables for each entity;
determining a plurality of cumulative distributions for the variables based on the logit values and the number of entities having a specific logit value;
binning the variables into a plurality of equally sized buckets based on the cumulative distributions;
determining a mean logit prediction value for each bucket;
assigning a rank number for each bucket based on the mean logit prediction values;
compiling a rank of score averages (ROSA) table for the entities based on the logit values and the buckets corresponding to the logit values;
determining a plurality of variables with the highest rank numbers;
identifying a definition for each of the plurality of variables;
generating a report based on the identified definitions; and
declining the one or more loan applications based on the plurality of variables with the highest rank numbers,
wherein a larger logit prediction value corresponds to a higher risk for the corresponding loan application and a higher rank number, and
wherein the non-parametric model is at least one of maximum likelihood (ML), k-nearest neighbors (kNN), and support vector machines (SVM).

8. The method of claim 7, wherein assigning the rank number for the buckets includes:
sorting the buckets in sequence based on the mean logit prediction values;
assigning the rank numbers in sequence based on the sequence of the buckets.

9. A system for identifying a number of variables that influence an outcome of one or more loan applications, the system comprising:
at least one database for storing raw values for one or more variables corresponding to a plurality of individuals;
at least one non-transitory computer-readable medium configured to store instructions; and
at least one processor configured to execute the instructions to perform operations comprising:
receiving, from the database, the raw values of the variables corresponding to one or more applicants among the plurality of individuals;
processing the raw values of the variables for the applicants using a non-parametric model to obtain logit prediction values, the logit prediction values indicating a first degree of risk for a corresponding loan application based on specific variable indicating a second degree of risk for the corresponding loan application based on the variables;
determining a plurality of cumulative distributions for the variables based on the logit values and a number of entities having a specific logit value;
binning the variables into a plurality of equally sized buckets based on the cumulative distributions;
determining a rank number for each bucket based on the logit prediction values of the variables associated with each bucket;
compiling a rank of score averages (ROSA) table for the entities based on the logit values and the buckets corresponding to the logit prediction values;
determining a plurality of variables for the corresponding loan applications based on the highest rank numbers;
identifying one or more reasons associated with the plurality of variables;
generating a report based on the reasons, and declining the loan application based on the plurality of variables with the highest rank numbers;
wherein a larger logit prediction value corresponds to a higher risk for the corresponding loan application and a higher rank number,
wherein the non-parametric model is at least one of maximum likelihood (ML), k-nearest neighbors (kNN), and support vector machines (SVM).

10. The system of claim 9, wherein determining the rank number for the buckets comprises:
determining mean logit prediction values for each bucket;
assigning the rank numbers in sequence based on the mean logit prediction values.

* * * * *